(12) United States Patent
Seibert et al.

(10) Patent No.: US 9,004,208 B2
(45) Date of Patent: Apr. 14, 2015

(54) ENERGY STORAGE DEVICE

(75) Inventors: David Seibert, Merzenich (DE); Jens Bockstette, Aachen (DE); Dragan Skundric, Aachen (DE); Martin Rosekeit, Aachen (DE)

(73) Assignee: FEV GmbH, Aachen (DE)

( * ) Notice: Subject to any disclaimer, the term of this patent is extended or adjusted under 35 U.S.C. 154(b) by 563 days.

(21) Appl. No.: 13/381,396

(22) PCT Filed: May 19, 2010

(86) PCT No.: PCT/EP2010/056917
§ 371 (c)(1),
(2), (4) Date: Apr. 5, 2012

(87) PCT Pub. No.: WO2011/000630
PCT Pub. Date: Jan. 6, 2011

(65) Prior Publication Data
US 2012/0181954 A1    Jul. 19, 2012

(30) Foreign Application Priority Data

Jun. 30, 2009    (DE) .......................... 10 2009 031 295

(51) Int. Cl.
*B60W 10/24*    (2006.01)
*H02J 7/14*    (2006.01)
*B60L 11/00*    (2006.01)
*B60L 11/18*    (2006.01)
*H02J 7/34*    (2006.01)
(Continued)

(52) U.S. Cl.
CPC ............. *H02J 7/1423* (2013.01); *B60L 11/005* (2013.01); *B60L 11/18* (2013.01); *B60L 11/1874* (2013.01); *H02J 7/345* (2013.01); *Y02T 10/7005* (2013.01); *Y02T 10/7022* (2013.01); *Y02T 10/705* (2013.01); *B60K 1/04* (2013.01); *B60K 2001/005* (2013.01); *B60K 6/28* (2013.01); *B60Y 2400/114* (2013.01); *Y02T 10/6278* (2013.01); *B60L 11/1868* (2013.01)

(58) Field of Classification Search
USPC ............ 180/54.1, 65.1–65.31, 69.6; 320/104, 320/134, 135; 903/903
See application file for complete search history.

(56) References Cited

U.S. PATENT DOCUMENTS 4,851,756 A * 7/1989 Schaller et al. ............... 320/126
5,086,235 A * 2/1992 Marquet et al. ................. 307/64
(Continued)

FOREIGN PATENT DOCUMENTS

CH    692831 A5    11/2002
CN    1527772    9/2004
(Continued)

OTHER PUBLICATIONS

Notice on the First Office Action (PCT Application in the National Phase), Sep. 29, 2013, 18 pages.
(Continued)

*Primary Examiner* — John Walters
*Assistant Examiner* — James Triggs
(74) *Attorney, Agent, or Firm* — Gifford, Krass, Sprinkle, Anderson & Citkowski, P.C.

(57) ABSTRACT

Energy storage device for storing electric energy for the partial or complete electrical drive of a vehicle, wherein the device has energy storages and power storages, a drive unit of a vehicle with an energy storage device as well as method for operating an energy storage device.

25 Claims, 3 Drawing Sheets

(51) Int. Cl.
  *B60K 1/04*    (2006.01)
  *B60K 6/28*    (2007.10)
  *B60K 1/00*    (2006.01)

(56) References Cited

U.S. PATENT DOCUMENTS

| | | | | |
|---|---|---|---|---|
| 5,532,572 | A * | 7/1996 | Okamura | 320/166 |
| 5,563,479 | A | 10/1996 | Suzuki | |
| 2009/0024252 | A1 * | 1/2009 | Aridome et al. | 700/275 |
| 2012/0035836 | A1 * | 2/2012 | Mueller et al. | 701/113 |

FOREIGN PATENT DOCUMENTS

| | | |
|---|---|---|
| CN | 101472758 | 7/2009 |
| GB | 2419751 | 5/2006 |

OTHER PUBLICATIONS

Notice on the Second Office Action, Apr. 18, 2014, 22 pages.

* cited by examiner

ENERGY STORAGE DEVICE

CROSS-REFERENCE TO RELATED APPLICATIONS

This application claims priority to and is a U.S. national phase application of PCT application PCT/EP2010/056917 having an international filing date of May 19, 2010, which in turn claims priority to German Patent Application 10 2009 031 295.1 filed on Jun. 30, 2009, both of which are incorporated herein in their entirety by reference.

FIELD OF THE INVENTION

The invention relates to an energy storage device for storing electric energy for the partial or complete electric drive of a vehicle, a drive unit of a vehicle with an energy storage device as well as a method for operating an energy storage device.

BACKGROUND OF THE INVENTION

Electric drives for vehicles, whether hybrid vehicles or pure electric vehicles, move into the centre of attention of the current development in respect to the reduction of the pollutant emission. The energy storage with batteries has in this case an important role. At the moment batteries in hybrid- or electric vehicles are individually adapted to the vehicle conditions, which necessitates an uneconomically high development expenditure. The development of flexible and safe battery systems is, therefore, sensible.

Storages for energy exist, which provide a lot of energy. These are, however, limited concerning their power. On the other hand storages for energy exist, which have a very high power, but are, concerning their energy capacity, insufficient. Citation WO 2008/121982 A1 discloses a modular construction of a battery with different battery cells. As battery cells have an electric resistance, losses arise in a current flow, which lead to the warming of the battery cells. Especially high energy batteries produce, because of their relative high internal resistance at peak currents high temperatures. High power batteries do not warm up as greatly because of their lower internal resistance, however, have a too low energy capacity for applications with a high energy requirement. A cooling of the batteries is expensive and necessitates a lot of installation space and weight.

SUMMARY OF THE INVENTION

An object of the invention is, to provide an energy storage device for a drive unit of a vehicle, as well as a method for operating an energy storage device, which prevents the disadvantages of the state of the art.

The object is arrived at by the subjects of the independent claims. Preferred embodiments and advantageous further improvements are stated in the dependent claims.

According to the invention, the energy storage device for storing electric energy for the partial or complete electric drive of a vehicle has energy storages and power storages. The internal resistance of the energy storages is larger than the internal resistance of the power storages, wherein a current regulator is provided, which limits a current flowing between the energy storages and the power storages. An advantage of the current regulator according to the invention is, that a warming of the energy storages can be kept so low by limiting the current, that no cooling of the energy storages is necessary or at least a less complex cooling of the energy storages is sufficient, for example a cooling with ambient air. The necessary current, especially the current peaks, can be taken advantageously from the power storages. The warming is, thus, limited to these and is in any way smaller than in energy rich storages.

Driving cycles in the automobile application are generally set up from constant speed phases and acceleration- or braking phases. The power requirement to maintain constant speeds is small in comparison to the requirement for an acceleration. But the power of a constant drive exists generally over a longer period than that of acceleration phases. The energy storage device according to the invention has the advantage, that constraints for electric vehicles are omitted. The compromise in such a vehicle, to select an energy storage with a high energy capacity and lower maximum power (high operating distance, low acceleration) or for a power storage with a maximum power, however a low energy content (high acceleration, low operating distance) is omitted. The specialist knows, that a power storage in the sense of the invention is also a storage of energy. The designation power storage serves only for the terminological differentiation. The main difference of the two storage types is their internal resistance. Concerning the power storages in the sense of the invention, besides batteries also other storages for electric energy known to the specialist are meant, especially capacitors, also known as SuperCaps. Those storages, which can cope with a high power, have a small internal resistance. The higher the energy capacity of an energy storage the higher also the resistance. The internal resistance is responsible for the heat development of energy storages. The smaller the resistance, the smaller the power dissipation and, thus, the heat development.

The current for the phases of constant speeds can be drawn advantageously from the energy storage, the current for the acceleration phases can be provided from the power storage. As the energy storage is operated with a defined current, the cooling can be omitted as an advantageous result. This is, depending on the power storage type, also possible for the power storage. The cooling of energy storages represents a high development expenditure and often an additional electric load. To do without a battery cooling could advantageously also save additional costs.

According to a preferred embodiment of the invention, the current regulator is controlled by means of a control such, that the current flow remains within a tolerance band. The current regulator preferably allows only the bi-directional transport of a charge from the storages with a higher voltage to the storages with a lower voltage. The bi-directional current regulator is current-controlled, i.e. is only controlled via the current by a coil. The voltages of the energy storages and of the power storages cannot be controlled such. This has the essential advantage, that the bi-directional current regulator can do without micro-controllers, whereby this can be realised in a cheap and simple manner.

According to a further embodiment of the invention a cooling is provided, wherein the power storages are cooled and the energy storages are not cooled. Furthermore, the bulky energy storages need more installation space than the power storages. The energy storages and the power storages can be accommodated in a common housing or can be arranged spatially separated.

According to a further preferred embodiment of the invention the energy storage device can be constructed in a modular manner, wherein energy storages and/or power storages can be added or removed. Preferably, the energy storages and/or power storages, as well as the energy storage device according to the invention have, for this, interfaces for the energy transport, the exchange of information, if necessary for the cooling and/or an excess pressure outlet in case of failure.

A further subject of the invention relates to a drive unit of a vehicle with the energy storage device according to the invention, wherein at least one electric machine is provided as a motor and/or as a generator. Preferably, the current flows from the energy storages via the current regulator to the electric machine. Furthermore, preferably the current flows from the power storages directly to the electric machine. Thereto, in the drive unit according to the invention, advantageously no heavy and expensive high-voltage-DC/DC-converter has to be used.

A further subject of the invention relates to a method for operating an energy storage device with energy storages and with power storages, wherein a current flow between the power storages and the energy storages is limited by means of a current regulator. Preferably, the flow of current is limited such, that it remains within a tolerance band and that a cooling of the energy storages is not necessary. Furthermore, preferably the power storages are cooled. According to an especially preferred embodiment, the current flow is only current-controlled and not voltage-controlled, whereby a cheap design of the current regulator without micro-controller is possible.

BRIEF DESCRIPTION OF THE DRAWINGS

Following, the invention is described by using drawings. The explanations are valid for the device according to the invention as well as for the method according to the invention. The explanations are only exemplary and do not limit the general inventive concept.

It shows.

DETAILED DESCRIPTION OF THE INVENTION

Figure 1:
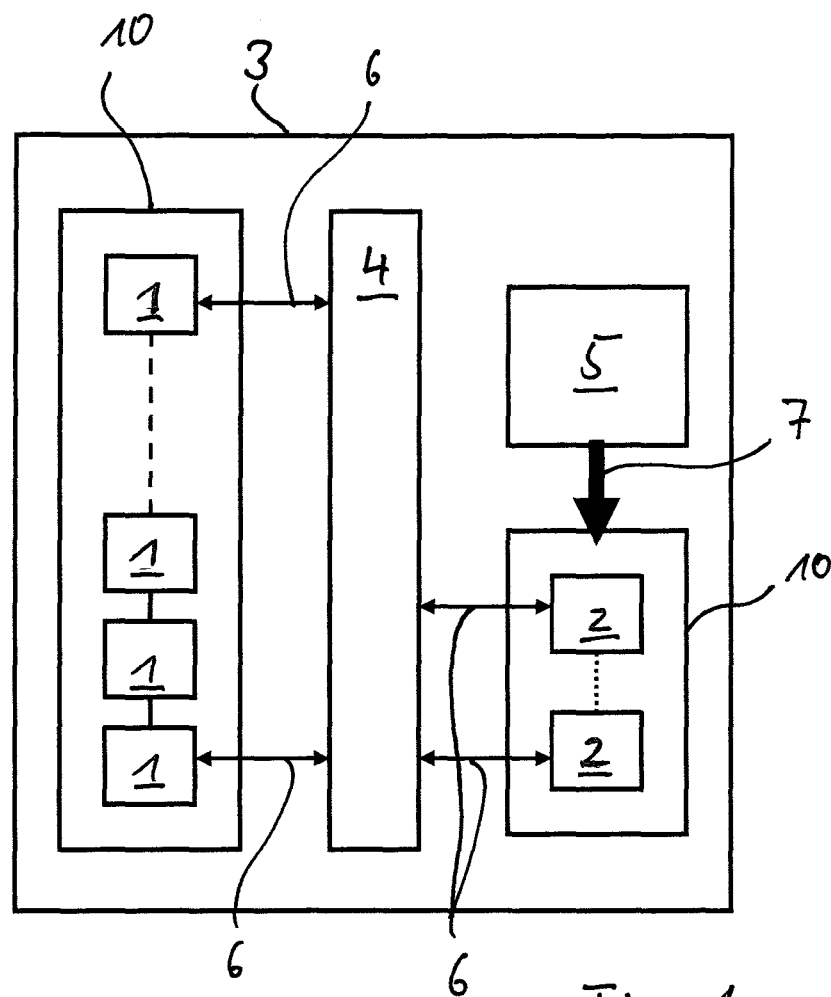
FIG. 1 a schematical representation of a first embodiment of the energy storage device according to the invention, FIG. 2 a circuit diagram of a current regulator of the energy storage device according to the invention, FIGS. 3 and 4 diagrams of the voltage—and the current intensity characteristics controlled by the current regulator according to FIG. 2, FIG. 5 a schematic circuit diagram of the current regulator according to FIG. 2 with current control, FIG. 6 the energy storage device according to the invention in a second embodiment, FIG. 7 a schematic representation of a drive unit of a vehicle.

In FIG. 1 an energy storage device 3 according to the invention for storing electric energy for the partial or complete electric drive of a vehicle (not shown) is shown schematically. The currents in a battery supply for a hybrid- or electric vehicle are controlled by a bi-directional current regulator 4, wherein in housings 10 two different types of batteries or storages are arranged, namely a battery with energy storages 2 and a further battery with power storages 1. The energy storages 1 and the power storages 2 can be together accommodated in one housing, wherein between the two batteries a current regulator 4 always controls the equalising current between the energy storages 1 and the power storages 2. The control is arranged such, that the energy storages 1 should ensure the constant drive operation of the vehicle, while the power storages 2 are mainly used for accelerating and for taking up high recuperation currents during braking. During even drive the power storages 2 are preferably charged by the energy storages 1 up to a certain degree, so that they are prepared for the up-take of recuperation currents, as well as for the delivery of current for accelerating the vehicle. The charge condition of the power storages 2 is preferably controlled depending on the drive condition, for example, that during high drive speeds the power storages are mainly discharged, as rather recuperation currents are to be expected over a longer time period, while during low drive speeds and especially during the stand-still a high acceleration ability is requested, i.e. preferably fully charged power storages 2. In FIG. 1 only the current, controlled by the bi-directional current regulator 4, between the energy storages 1 and the power storages 2 is indicated by double headed arrows 6. Current flows to the drive unit (not shown) and from the drive unit are described in the following by means of further representations.

The power storages 2 have to provide temporarily high power ratings, however do not need such a large capacity. Therefore, the power storages 2 need a smaller installation space than the energy storages 1. The energy storages 1 are designed for a permanent drive at low power rating and need a large capacity. The two types of batteries are cooled differently. The power storages need a cooling 5, the energy storages 1 however need with a suitable design no cooling, or a lower cooling, for example an air cooling by ambient air. As only the power storages 2 need an intensive cooling in total, represented by the arrow 7, only a small space requirement is needed for the cooling 5. The two batteries can be integrated into one housing as partial modules and can be electrically separated by the current regulator 4. The bi-directional current regulator 4 limits the current flowing between the types of batteries. Its functional principle is described in the following by using FIGS. 2 to 4.

Figure 2:
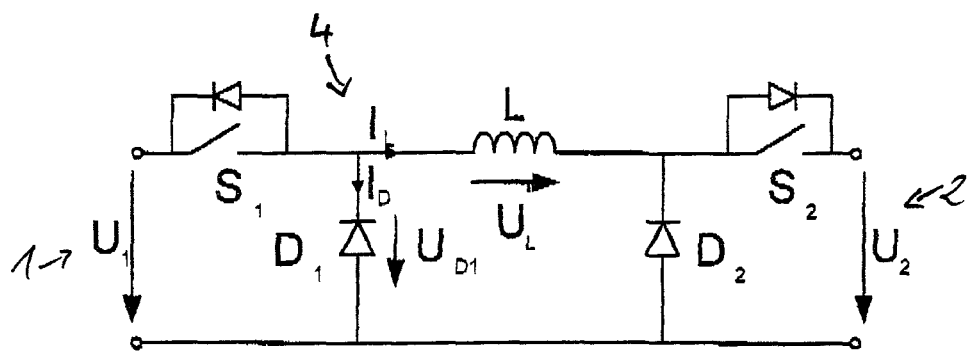

In FIG. 2 a principal circuit diagram of a bi-directional current regulator 4 is shown. In the case, that the voltage U1 of the energy storages 1 is larger than the voltage U2 of the power storages 2, the switch S1 is closed. A diode D1 is arranged in reverse direction. The voltage $U_L$ of the coil L is $U_L=U_1-U_2$. The current increase through the coil is limited by its inductance. $U_L=L*(di/dt)$. $U_L$ is preferably constant. Thus, $\Delta I=1/L*U_L*\Delta t=1/L*(U_1-U_2)*\Delta t$ results.

If the switch S1 is opened, the voltage at the coil L becomes $U_L=-U_2$. The current increase is now negative. The current of the coil depletes across the diode $D1: \Delta I=1/L*U_L*\Delta t=1/L*U_2*\Delta t$.

Figure 3:
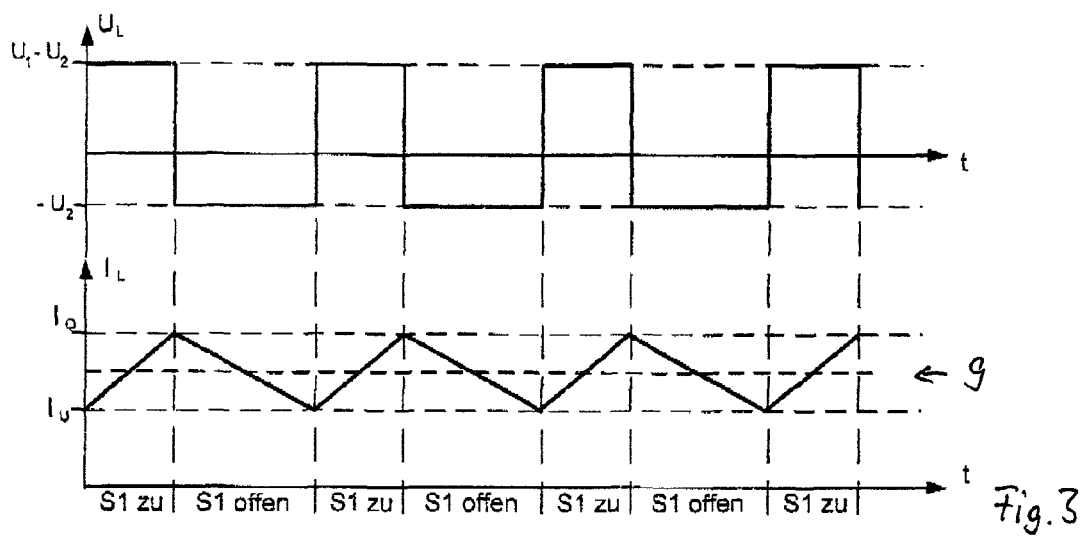

In FIG. 3 the characteristics of the current rating and the voltage across the coil L is shown according to FIG. 2 idealised in a diagram on the axes designated with $I_L$ or $U_L$. Time is respectively shown on the axis, designated with t. For each interval, the switch position of the switch S1 is indicated.

As long as the switch S1 is closed, the current flows from the voltage source with the higher voltage into the load, independent of the position of switch S2. If the current reaches the upper limit $I_O$, the switch S1 is opened and the current drops. If the current reaches the lower limit $I_U$, the switch S1 is again closed. Then the current increases again, so that it remains always in a tolerance band 9.

Figure 4:
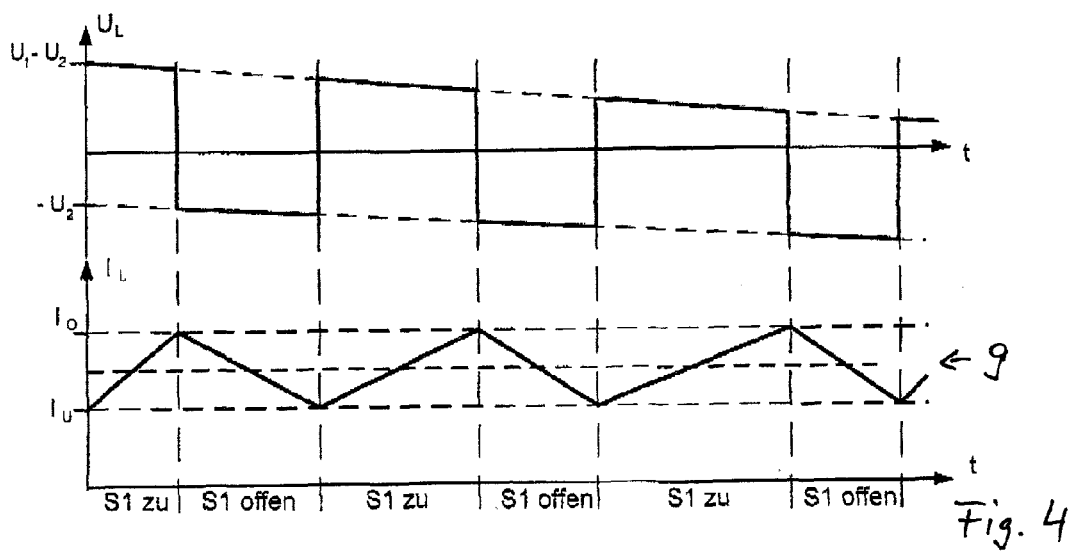

If this idealised current control is applied to two real batteries, then the voltages U1 and U2 approach each other. In FIG. 4, such a characteristic of the current rating and the voltage across the coil L is shown in a diagram on the axes designated with $I_L$ or $U_L$. Time is, respectively, shown on the axis designated with t. For each interval, the switch position of switch S1 is indicated.

The case, that the voltage U2 is larger than the voltage U1 is analogue to the above described case, i.e. switch S2 is closed and opened, so that the diode $D_2$ is arranged in inverse direction, in other words the current of the coil can flow across the diode D₂. The position of the switch S₁ is unimportant.

Figure 5:
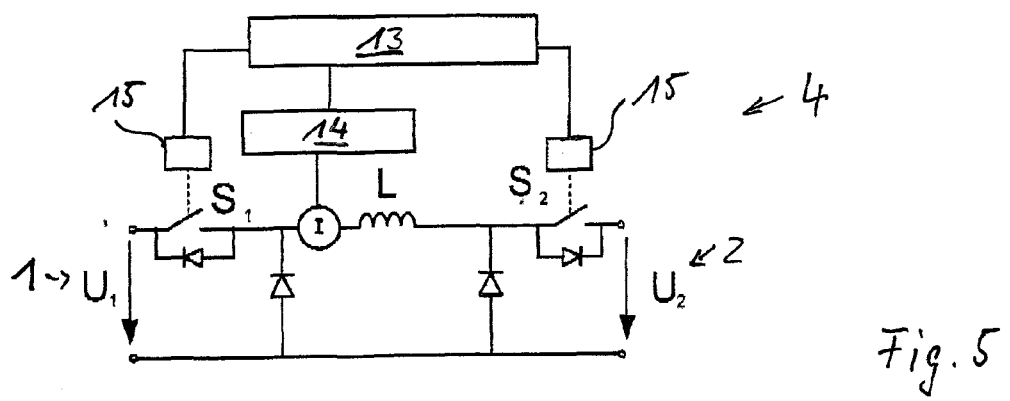

In FIG. 5 a current regulator 4 with a current controlled tolerance band control is shown in a diagram showing the principle. By means of measuring the current I at the coil L by an ammeter 14, a control 13 is in the position, to control the switch position of the switches S1 and S2 as described in connection with FIGS. 3 and 4. For this, the control 13 controls two actuators 15 of the switches S1 and S2. By means of this current controlled tolerance band control and the topography of a "double" downwards converter, the combination of an energy—and power storage can be realised. A further advantage is, that the wiring of the energy storages 1 to the current regulator 4 has to be only designed for low currents. Thus, costs and weight are saved. The bi-directional current regulator 4 can in principal be used in all connected energy storages for the pre-defined current exchange amongst each other.

Figure 6:
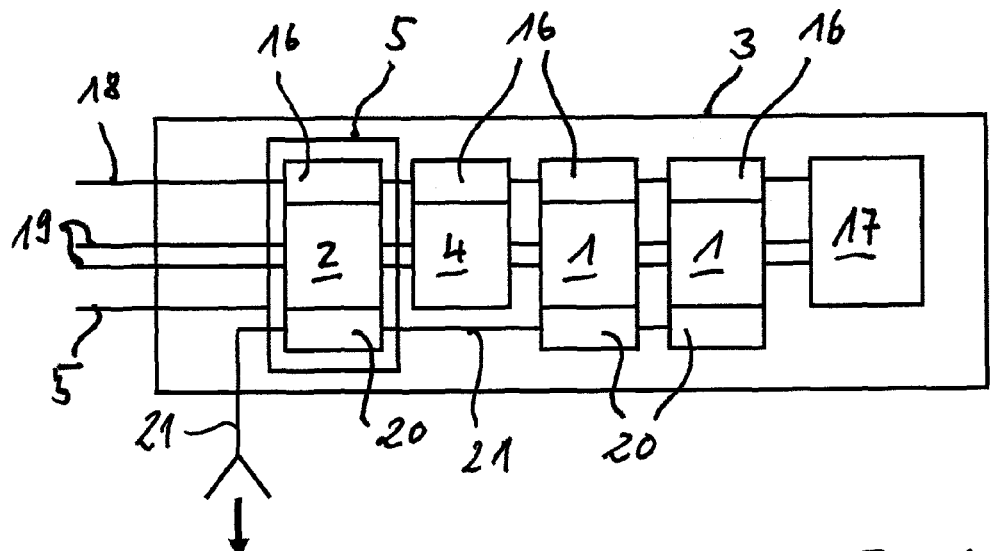

In FIG. 6 an energy storage device 3 is shown schematically, which has a modular structure. Energy storages 1 as well as power storages 2 are provided. So that these can be combined, a bi-directional current regulator 4 has to control the current flow between the power storages 3 and the energy storages 1. The modules of the energy storage device 3 have approximately the same form and are provided with the same interfaces (not shown), whereby the energy storage device 3 is flexibly usable. The module with the power storages 2 is, because of the high charging rates and discharging rates, provided with a cooling 5. The modules with the energy storages 1 are loaded in such a low manner, that it needs no cooling. Each module is provided with its own control element 16, for example a so called slave-module. These slave-modules 16 are, for example, connected to each other with a CAN-bus 18 and are controlled via a central control 17, the so-called battery master.

The modular system enables a high flexibility and at the same time a higher safety. Different storage systems can be combined with each other. The voltage pro module will generally not exceed 60 Volts and the high voltage connections 19 are preferably accommodated in the housing of the energy storage device 3 in a physically non-contactable manner. Via safety interfaces 20, all modules are connected to an excess pressure outlet 21, which in the case of an error can discharge the excess pressure safely. The energy storage device 3 is preferably water-tight and air-tight to prevent condensation formation and to allow in case of an error hardly any oxygen for a smouldering fire.

Figure 7:
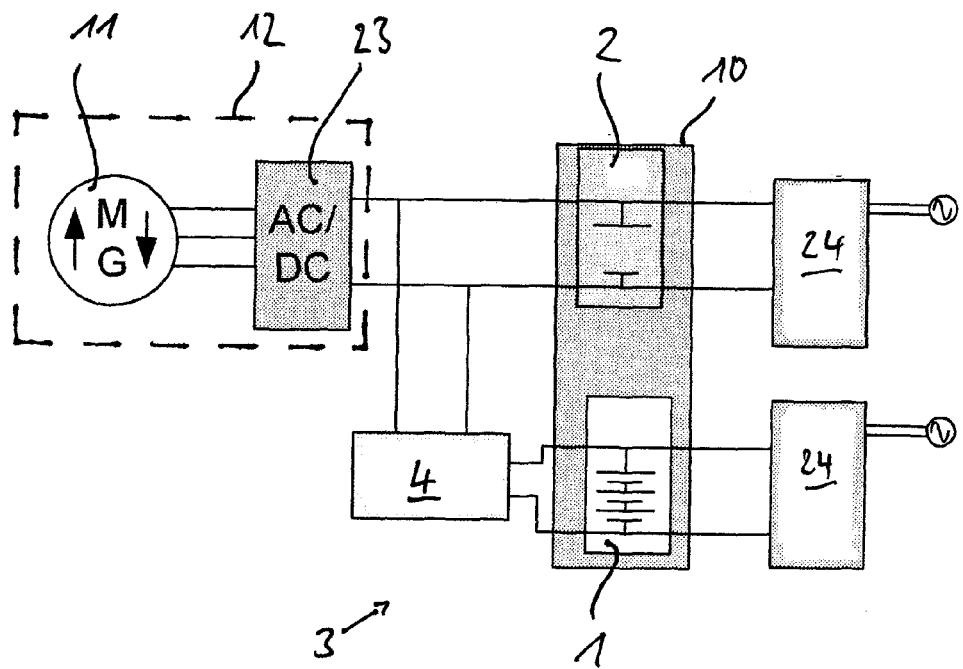

FIG. 7 shows schematically a drive unit of a vehicle according to the invention with an energy storage device 3. The power storages 2 are preferably connected to a drive inverter 22 of an electric machine 12, so that high power requirements can be fulfilled, without that for this the whole power has to be transmitted via an expensive and heavy DC/DC converter. Furthermore, the current regulator 4 can be controlled such, that only a defined amount of current flows from the energy storages 1 into the power storages 2 and thus, the warming of the energy storages itself is kept low. As a further advantage, the current regulator 4 can be designed such, that it contains as few as possible semiconductor components and inductances, whereby the costs can be distinctly reduced. At the comparably small power ratings, which flow across the current regulator 4, the component costs are advantageously smaller, than in high power DC/DC converters according to the State of Art. A motor/generator 11 serves for driving the vehicle or in the generator operation for charging the energy storage 10. Chargers 24 can be provided for charging the energy storage 1 as well as charging the power storage 2.

It is to be understood that various modifications are readily made to the embodiments of the present invention described herein without departing from the scope and spirit thereof. Accordingly, it is to be understood that the invention is not to be limited by the specific illustrated embodiment, but by the scope of the appended claims.

We claim:

1. An energy storage device (3) for storing electric energy for a partial or complete electric drive of a vehicle, comprising:
    energy storages (1) and power storages (2), wherein an internal resistance of the energy storages is larger than an internal resistance of the power storages, and
    a current regulator (4) which limits a current flowing between the energy storages and the power storages, wherein the current flow is controlled by the current regulator (4) in dependency of a current strength.

2. The energy storage device according to claim 1, characterised in
    that the current regulator (4) is controlled by a control (13) such, that the current flow remains within a tolerance band (9).

3. The energy storage device according to claim 1, characterised by
    a cooling (5), wherein the power storages (2) are cooled and the energy storages (1) are not cooled.

4. The energy storage device according to claim 1, characterised in
    that the energy storages (1) take up more installation space than the power storages (2).

5. The energy storage device according to claim 1, characterised in
    that the energy storages and the power storages are constructed in a modular manner.

6. The energy storage device according to claim 1, characterised in
    that the energy storages (1) and the power storages (2) are arranged spatially separated.

7. The energy storage device according to claim 1, further comprising a drive unit, wherein at least one electric machine (12) is provided as a motor (11) or as a generator (11).

8. The energy storage device of claim 7, characterised in
    that the current flows from the energy storages (1) via the current regulator (4) to the electric machine (12).

9. The energy storage device of claim 7, characterised in
    that the current flows from the power storages (2) directly to the electric machine (12).

10. A method for operating an energy storage device (3) with energy storages (1) and power storages (2), comprising:
    a current flow between the power storages (2) and the energy storages (1) is limited by means of a current regulator (4) and the current flow is limited such, that it remains within a tolerance band (9) and that a cooling of the energy storages (1) is not necessary.

11. The method according to claim 10, characterised in
    that the power storages (2) are cooled.

12. The method according to claim 10, characterised in
    that the current regulator (4) is controlled by a control (13) such, that the current flow remains within the tolerance band (9).

13. The method according to claim 10,
characterised in
that the current flow is controlled by the current regulator (4) in dependency of a current strength.

14. The method according to claim 10,
characterised by
a cooling (5), wherein the power storages (2) are cooled and the energy storages (1) are not cooled.

15. The method according to claim 10,
characterized in
that the energy storages (1) take up more installation space than the power storages (2).

16. The method according to claim 10,
characterised in
that the energy storages and the power storages are constructed in a modular manner.

17. The method according to claim 10,
characterised in
that the energy storages (1) and the power storages (2) are arranged spatially separated.

18. The method according to claim 10,
further comprising
a drive unit and at least one electric machine (12) provided as a motor (11) or as a generator (11), the current flowing from the energy storages (1) via the current regulator (4) to the electric machine (12).

19. An energy storage device (3) for storing electric energy for a partial or complete electric drive of a vehicle, comprising:
energy storages (1) and power storages (2), wherein an internal resistance of the energy storages is larger than an internal resistance of the power storages,
a current regulator (4) which limits a current flowing between the energy storages and the power storages,
a drive unit, and
at least one electric machine (12) provided as a motor (11) or as a generator (11), wherein the current flows from the energy storages (1) via the current regulator (4) to the electric machine (12).

20. The energy storage device according to claim 19,
characterised in
that the current regulator (4) is controlled by a control (13) such, that the current flow remains within a tolerance band (9).

21. The energy storage device according to claim 19,
characterised in
that the current flow is controlled by the current regulator (4) in dependency of a current strength.

22. The energy storage device according to claim 19,
characterised by
a cooling (5), wherein the power storages (2) are cooled and the energy storages (1) are not cooled.

23. The energy storage device according to claim 19,
characterised in
that the energy storages (1) take up more installation space than the power storages (2).

24. The energy storage device according to claim 19,
characterised in
that the energy storages and the power storages are constructed in a modular manner.

25. The energy storage device according to claim 19,
characterised in
that the energy storages (1) and the power storages (2) are arranged spatially separated.

* * * * *